(12) United States Patent
McCabe

(10) Patent No.: US 7,513,746 B2
(45) Date of Patent: Apr. 7, 2009

(54) WINDMILL BLADE SHAPING AND MOUNTING TO ENHANCE PERFORMANCE

(75) Inventor: Francis J. McCabe, Ottville, PA (US)

(73) Assignee: OmniWind Energy Systems LLC, Dublin, PA (US)

( * ) Notice: Subject to any disclaimer, the term of this patent is extended or adjusted under 35 U.S.C. 154(b) by 282 days.

(21) Appl. No.: 11/407,727

(22) Filed: Apr. 19, 2006

(65) Prior Publication Data

US 2006/0239821 A1    Oct. 26, 2006

Related U.S. Application Data

(60) Provisional application No. 60/673,508, filed on Apr. 21, 2005.

(51) Int. Cl.
*F03D 3/06* (2006.01)

(52) U.S. Cl. .................. 416/197 R; 416/202; 416/228; 415/4.3; 415/60; 415/908

(58) Field of Classification Search ............... 415/4.3, 415/4.5, 60, 68, 905, 908; 416/197 R, 202, 416/223 R, 228, 235, 236 R, 237
See application file for complete search history.

(56) References Cited

U.S. PATENT DOCUMENTS

| 2,458,419 | A | * | 1/1949 | Reinmann | 415/193 |
|---|---|---|---|---|---|
| 4,171,929 | A | * | 10/1979 | Allison | 416/226 |
| 4,877,374 | A | * | 10/1989 | Burkett | 416/136 |
| 5,711,653 | A | * | 1/1998 | McCabe | 416/237 |
| 7,186,083 | B2 | * | 3/2007 | Bayly | 416/51 |

* cited by examiner

*Primary Examiner*—Igor Kershteyn
(74) *Attorney, Agent, or Firm*—Gregory J. Gore

(57) ABSTRACT

A method of mounting windmill blades their enhance performance is disclosed. The blades have a transverse cross-sectional shape having a predominately flat chord section and are mounted such that the chord section lies in a plane that is substantially at 90 degrees to the axis of the shaft upon which they are mounted.

17 Claims, 5 Drawing Sheets

WINDMILL BLADE SHAPING AND MOUNTING TO ENHANCE PERFORMANCE

CROSS-REFERENCE TO RELATED APPLICATIONS

This application is a Continuation-in-Part of my prior Provisional application entitled Squish swish windmill blade to enhance performance, Ser. No. 60/673,508, filed Apr. 21, 2005 the disclosure of which is incorporated herein by reference as if fully set forth.

BACKGROUND OF THE INVENTION

1. Technical Field of the Invention

This invention relates to airfoil shapes and their mounting, and to add-on blades to enhance the performance of windmills.

2. Description of the Art

The existing art focuses on a very seductive windmill aerodynamics sometimes called 'planar flow', 'kiting' or my own deflected air flow as a "squished" sheet of air' that accelerates after impacting against virtually flat to the wind blade(s). A body of moving air (wind) can be squished down to a very thin sheet that is moving off the trailing edge of a blade at up to 10 times the relative speed of the incoming air to the departing rotating blade. The currently used blade design force dynamics produces this great rotating speed, but with little usable torque.

SUMMARY OF INVENTION

I have invented a new airfoil mounting performance principle (optimal center of pressure caused angle of attack positioning). The new aerodynamics means any windmill will be dramatically improved at much lower air speeds.

DESCRIPTION OF THE PREFERRED EMBODIMENTS

The preferred embodiments are disclosed in the attached drawings, from which it will be appreciated that I have invented a high-speed airfoil for use on the rotor of a windmill which also can be mounted in front of an existing rotor. The blade has a leading edge lip ahead of the squish—to make the swish—with good torque.

Figure 7:
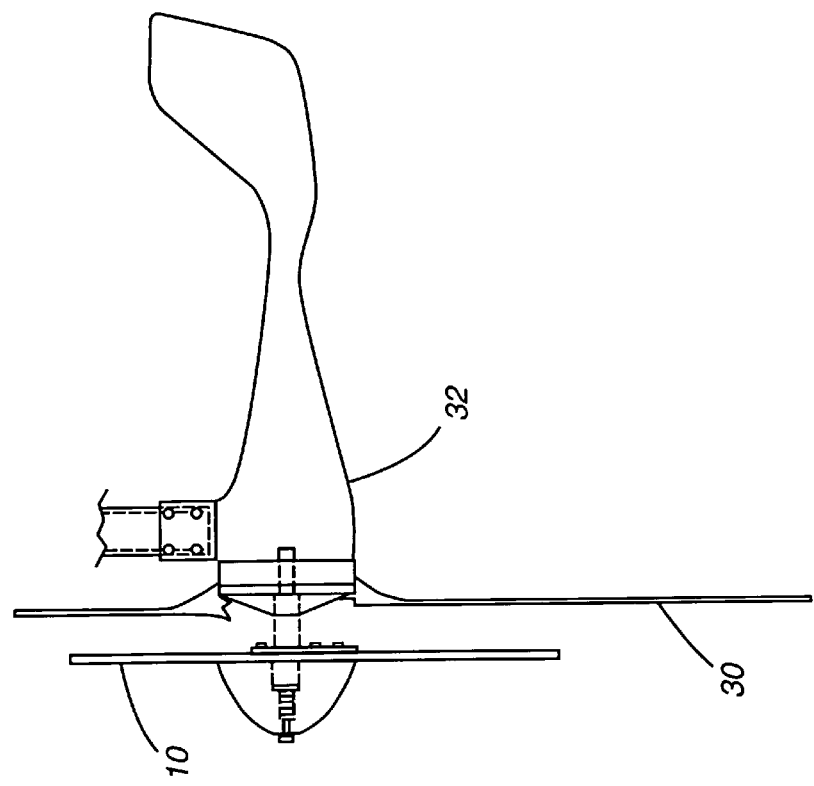
FIG. 7 is a front view of a windmill blade arrangement in accordance with my invention shown mounted to a hub of a prior art windmill.
Figure 8:
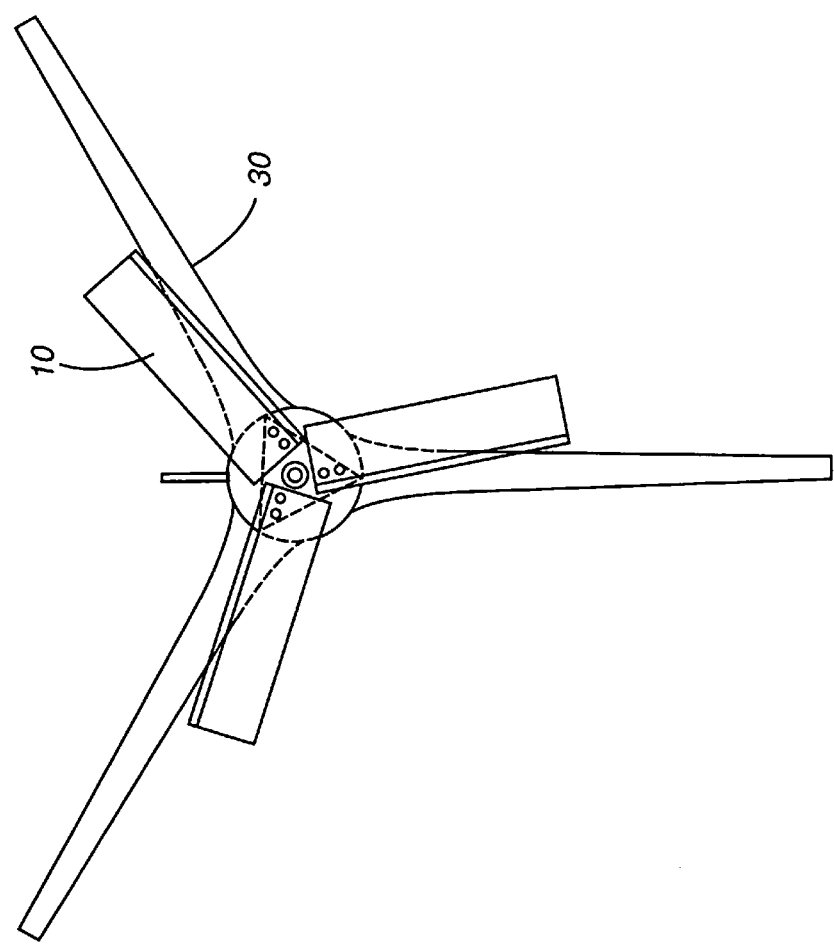
FIG. 8 is a side view of the apparatus shown in FIG. 7.

The blades may be approximately one half the diameter of existing blades—when used in the "piggy back" mounting (in front of standard blades) as shown in FIGS. 7 and 8.

My new blades add power, while providing some braking to reduce speed. This new airfoil design (with optional hinged blade mounting mechanics) recognizes and enhances the 'squish' power potential with two innovations.

1. A start up initial/high angle of attack (non squish) positioning option that handles the detrimental slow starting and also allows a higher load handling capability by utilizing the changing center of (wind) pressure phenomenon to:

a) initially (for more start-up power) hold the blade at the higher torque providing lower angle of attack to wind from approximately 80 degrees to 65 degrees, and b) as (if) the lower torque speed up occurs transferring the air pressure (squish) resultant more directly against the 'blade edge' (now with leading edge air catcher lip) geometric pivoting raises the angle of attack to the high speed position—without springs or other extra force means.

2. Imposing the leading edge air catcher forward lip that provides an air blocking surface for significantly enhanced novel leading edge pressure differential "squish" retaining surface increase, which allows a more effective high rpm turning air power resultant. The impinged air then can more likely jet off the trailing edge because the flattened air sheet is blocked at the leading edge.

Other enhancements include:

More (up to eight) blades.

Leading edge (forward tip) blade rake.

A slight bend into the wind, trailing section angle, that permits another flow dynamic of planar jetting enhancements of outgoing air just as it leaves the trailing edge additionally inhibits underside pressure overrun from the blade bottom to top which would reduce pressure differential. There is also the relative air speed differential causing a push back against the blade (and forward lip). It also does some ordinary windmill pressure aerodynamics at the trailing edge section.

A root shape geometric that again employs ordinary Bernoulli and McCabe ('windmilling aerodynamics') of the slower moving (near hub) blade section.

The blade is very thin, more easily slicing through the air—displacing less mass—even with the forward lip which is effectively inconsequential into the air as it is essentially one with the forward portion of the impinged air which would normally encounter just the air (resistance) and give away power transfer to the blade that is now pushing against the leading edge lip.

In small diameter wind turbines it is more effective when the blade is twisted so that the blade root is at an angle of attack of 10 to 15 degrees to rotation; most preferably 11 to 14 degrees; and the outer (faster) tip is at 8-10 degrees less to the plane of rotation.

In larger diameter mills blade twist is less critical, so production costs can be reduced by having a constant angle (no twist). This constant angle is best in the 7-10 degree angle to the plane of rotation (80-83 degrees to the wind).

Referring to FIG. 1, three blades 10 are fastened to a hub 12 by any suitable means, such as the rivets 14. The hub is mounted on a shaft 16 to rotate the shaft in the direction of the arrow "A" upon action of the wind (moving in the direction of the "AIR FLOW" arrow shown in FIG. 2).

Figure 1A:
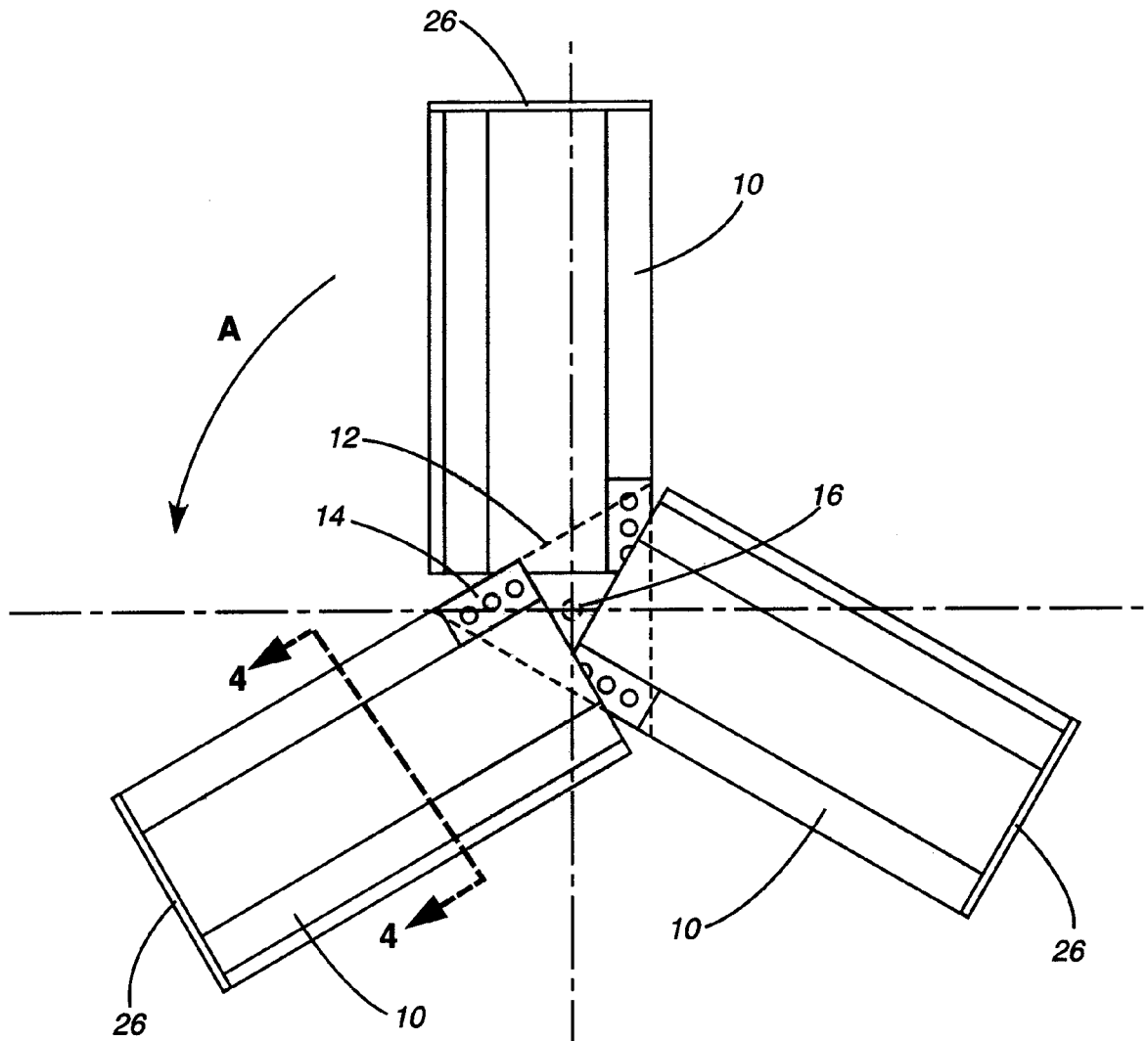
FIG. 1A is a front view of a windmill assembly having my new blade design and positioning.
Figure 4:
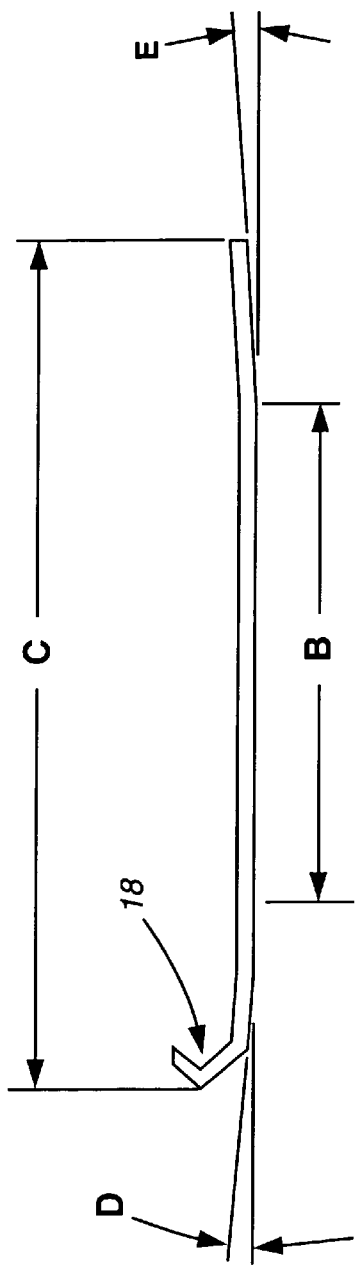
FIG. 4 is a side view of a blade.

A typical blade cross-section taken as indicated by the lines and arrows 4-4 in FIG. 1A, is shown in FIG. 4. Such a structure is shown generally in my prior U.S. Pat. No. 5,711,653 and comprises a planar face or chord portion, leading and trailing edges angled to said chord portion such that the cross-section is a pan shape; and a portion extending from one edge back toward the chord portion. It has an overall length of "C" and a chord length "B" along the largest, substantially flat chord blade section. For use in the present invention, the profile of the blade is substantially flatter than my prior blades. In particular, for a chord length of four and one-half inches, the total height—including the lip—is five eights of an inch.

In addition, I provide end caps 26 FIG. 1A to close off the radial ends of the pan shaped structure.

Figure 2:
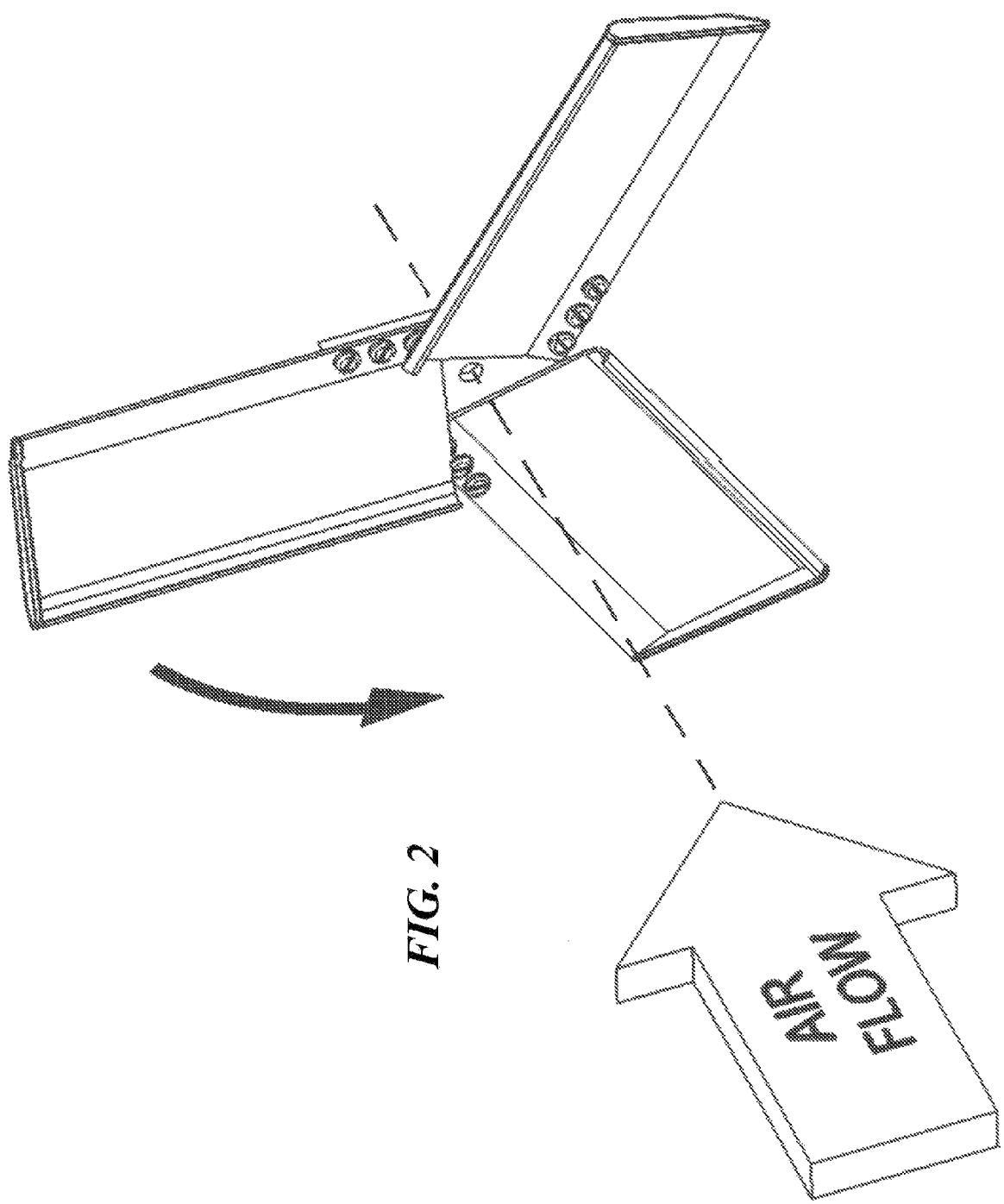
FIG. 2 is a top-front right isometric view of the windmill assembly shown in FIG. 1A.
Figure 3:
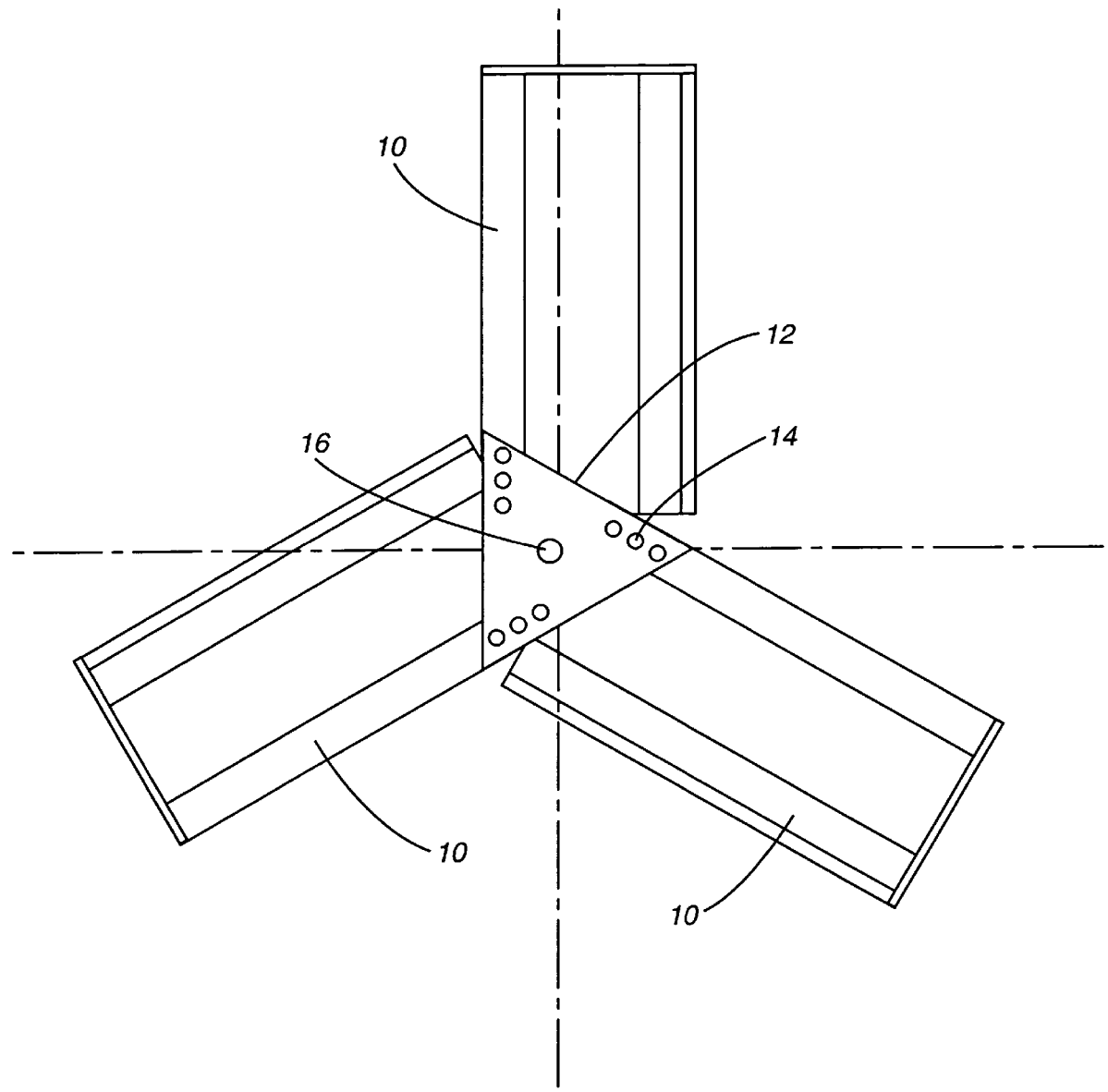
FIG. 3 is a rear view of the windmill assembly shown in FIG. 1.

The hub 12 is flat (that is, at 90 degrees) to the wind "AIR FLOW" as shown in FIG. 2. The blade chord portion "B" is also substantially at 90 degrees to the air flow (in a plane taken at 90 degrees to the axis of the shaft 16). When the air hits the blade it spreads out over the blade and eventually runs into and builds up against the lip designated generally 18 FIG. 4; which is the leading edge. The other edge is referred to as the trailing edge.

Figure 5:
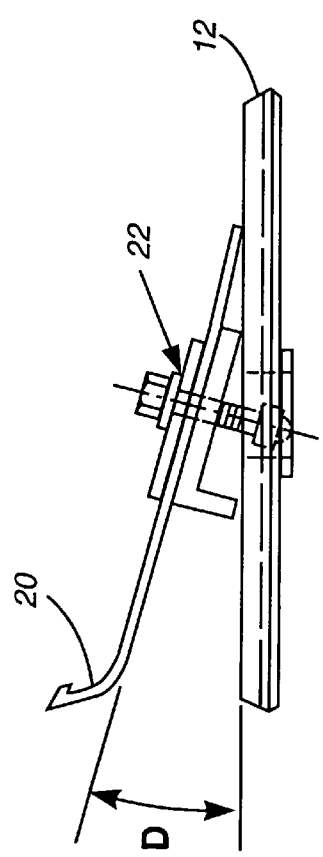
FIG. 5 is a side view of another blade mounted to a hub.

In the preferred embodiment, the lip may be shaped as at 20, FIG. 5 and the blade may be positioned at an angle "D". This positions the blade in the range of 78 to 87 degrees; as distinguished from 90 degrees.

Test results are shown in the following chart.

Comparison of 4.5 inch air foils in a small wind tunnel at a wind speed of 15 mph

| Degrees of angle of attack | new aerodynamic mounting (NASS) squish/swish | old aerodynamic mounting of my Patented blades | typical air foil NACA 0012 |
| --- | --- | --- | --- |
| 90 | 0.5 lb of rotational force | 0.3 lb of rotational force | 0.3 lb of rotational force |
| 85 | 0.6 | 0.4 | 0.4 |
| 80 | 0.7 | 0.5 | 0.5 |
| 75 | 0.8 | 0.7 | 0.6 |

These results show that the new aerodynamics squish/swish (NASS) flat against the wind positioning (between 90 and 75 degrees) out performs the old aerodynamics and standard air foils by a ⅔ increase.

In the normal angle of attack range, the NASS air foil out performs the standard airfoil by 25-35%. More recent testing suggests a preferred range of 78 to 83 degrees.

As can be seen, the NASS is a fast rotating wind turbine air foil that has vastly higher torque than standard air foils.

Figure 6:
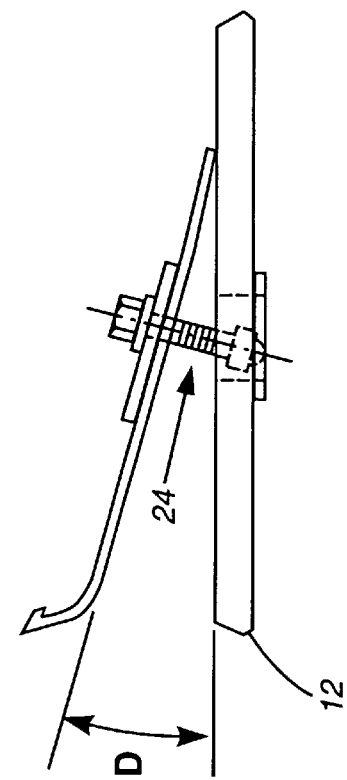
FIG. 6 is a side view of a blade mounted to a hub in a different manner.

While the blade may be mounted in a fixed position; as shown by the nut and bolt arrangement designated generally at 22 FIG. 5; an adjustable arrangement can be used as for example by the addition of a spring 24 FIG. 6. This allows for field setting of the angle.

Figure 1B:
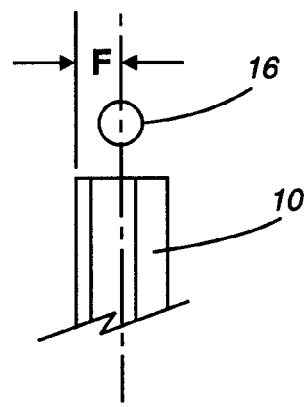
FIG. 1B is a portion of a blade and shaft showing the preferred relative positioning range.

The preferred location of the blades with respect to the center line of the shaft is off-center. Referring to FIG. 1B, the leading edge (lip) is most preferably in the range of (F) ⅓ to ¼ of the width of the blade from the center line of the shaft. This produces a leading edge rake which helps keep the air flow aligned perpendicularly to the blade.

End caps 26 at the outer edges of the blades 10 FIG. 1A help keep the air from spilling off the blade.

The air foil may also be mounted in front of an existing prior art rotor blade 30 of a wind turbine 32 as shown in FIGS. 7 and 8, to enhance power output.

From this description it has been shown that I have invented a windmill having blades mounted on a shaft, at least some of which blades have a transverse cross-sectional shape having a predominately flat chord section, said blades being mounted such that the chord section lies in a plane that is substantially at 90 degrees to the axis of the shaft. The plane may be positioned at an angle in the range of 78 to 87 degrees to the axis of the shaft. Furthermore, the blades can be positioned off-center to the axis of the shaft.

The blades have a leading edge positioned in the range of ¼ to ⅓ the width of the blade from the axis of the shaft.

The windmill may be mounted in front of the blades of a wind turbine.

I have also invented a method of mounting windmill blades on the shaft of a windmill, at least some of which blades have a transverse cross-sectional shape having a predominately flat chord section, comprising mounting said blades such that the chord section lies in a plane that is substantially at 90 degrees to the axis of the shaft.

The plane may be at an angle in the range of 78 to 87 degrees to the axis of the shaft.

The blades may be positioned off-center to the axis of the shaft.

The blades have a leading edge positioned in the range of ¼ to ⅓ the width of the blade from the axis of the shaft.

The windmill may be mounted in front of the blades of a wind turbine.

What is claimed is:

1. A windmill comprising: blades mounted on a shaft, at least some of which blades have a transverse cross-sectional shape having a predominantly flat chord section, said blades being mounted such that the chord section lies in a plane that is substantially at 90 degrees to the axis of the shaft, said axis adapted for placement in the direction of a flow of air; and
   a lip extending along the end of a leading edge of each of said blades forming a trough for blocking the flow of air toward the lip after it impinges a chord portion, said lip comprising a portion of the blade extending from the leading edge at a reverse angle from the direction of travel of the blade back toward the chord portion.

2. The windmill of claim 1 wherein the plane is positioned at an angle in the range of 78 to 87 degrees to the axis of the shaft.

3. The windmill of claim 1 wherein blades are positioned off-center to the axis of the shaft.

4. The windmill of claim 3 wherein the blades have a leading edge positioned in the range of ¼ to ⅓ the width of the blade off-center from the center line of the shaft.

5. The windmill of claim 1 mounted in front of the blades of a wind turbine; said wind turbine having a shaft coaxial with the shaft of the windmill.

6. The windmill of claim 1 wherein the blades further comprise a planar chord portion, leading and trailing edges angled to said chord portion such that a cross-section of the blade is a pan shape.

7. The windmill of claim 6 wherein end caps are attached to the blades to close off the radial ends of the pan shaped structure.

8. The windmill of claim 1 wherein the overall length of the chord section being approximately seven times the height of the blade.

9. The windmill of claim 8 further described in that the length of the overall chord section is 4 and ½ inches and the height is ⅝ of an inch.

10. The windmill of claim 9 wherein said trailing edge angle is approximately 5 degrees.

11. The windmill of claim 1 wherein each of said blades includes a trailing edge extending upwardly from said chord portion at a shallow angle.

12. A method of mounting windmill blades on the shaft of a windmill, at least some of which blades have a transverse cross-sectional shape having a predominantly flat chord-section, comprising mounting said blades such that the chord section lies in a plane that is substantially at 90 degrees to the axis of the shaft, said axis adapted for placement in the direction of a flow of air; and a lip extending along the end of a leading edge of each of said blades at a reverse angle forming a trough for blocking the flow of air toward the leading edge after it impinges a chord portion, said lip comprising a portion of the blade extending from the leading edge back from the direction of travel toward the chord portion.

13. The method of claim 12 wherein the plane is at an angle in the range of 78 to 87 degrees to the axis of the shaft.

14. The method of claim 12 wherein he blades are positioned off-center to the axis of the shaft.

15. The method of claim 14 wherein the blades are positioned in the range of ¼ to ⅓ the width of the blade off-center from the center line of the shaft.

16. The method of claim 12 wherein the windmill is mounted in front of the blades of a wind turbine having a shaft coaxial with the shaft of the windmill.

17. The method of claim 12 wherein the blades further comprise a planar chord portion, leading and trailing edges angled to said chord portion such that a cross-section of the blade is a pan shape; and a portion of the blade extending from a leading edge upwardly and back from the direction of travel toward the chord portion; and end caps are attached to the blades to close off the radial ends of the pan shaped structure.

* * * * *